United States Patent
Li et al.

(10) Patent No.: US 10,193,713 B2
(45) Date of Patent: Jan. 29, 2019

(54) METHOD FOR SENDING AND RECEIVING SIGNAL, AND CORRESPONDING DEVICE AND SYSTEM

(71) Applicant: Huawei Technologies Co., Ltd., Shenzhen (CN)

(72) Inventors: Liangchuan Li, Shenzhen (CN); Ling Liu, Shenzhen (CN)

(73) Assignee: Huawei Technologies Co., Ltd, Shenzhen (CN)

(*) Notice: Subject to any disclaimer, the term of this patent is extended or adjusted under 35 U.S.C. 154(b) by 0 days.

(21) Appl. No.: 15/270,286

(22) Filed: Sep. 20, 2016

(65) Prior Publication Data

US 2017/0012802 A1    Jan. 12, 2017

Related U.S. Application Data

(63) Continuation of application No. 15/078,717, filed on Mar. 23, 2016, now Pat. No. 9,467,311, which is a (Continued)

(51) Int. Cl.
*H04B 7/06* (2006.01)
*H04L 25/03* (2006.01)

(52) U.S. Cl.
CPC .. *H04L 25/03012* (2013.01); *H04L 25/03254* (2013.01); *H04L 25/03261* (2013.01); *H04L 25/03834* (2013.01)

(58) Field of Classification Search
CPC ......... H04L 25/03012; H04L 25/03261; H04L 25/03834; H04L 25/03254
(Continued)

(56) References Cited

U.S. PATENT DOCUMENTS 8,401,108 B1    3/2013    Haddadin et al.
2003/0185308 A1    10/2003    Schoenborn
(Continued)

FOREIGN PATENT DOCUMENTS

CN    1996975 A    7/2007
CN    101795152 A    8/2010
(Continued)

OTHER PUBLICATIONS

Cai, J.X. et al., "Transmission of 96x100G Pre-Filtered PDM-RZ-QPSK Channels with 300% Spectral Efficiency over 10,608km and 400% Spectral Efficiency Over 4,368km," Optical Fiber Communication Conference, OSA Technical Digest (CD) (Optical Society of America, 2010), paper PDPB10, 3 pages.
(Continued)

*Primary Examiner* — Shuwang Liu
*Assistant Examiner* — Fitwi Hailegiorgis
(74) *Attorney, Agent, or Firm* — Slater Matsil, LLP (57) ABSTRACT

A method for sending and receiving a signal is disclosed, and a corresponding device and system. The method includes performing constellation mapping on a data stream to obtain a mapped signal, and performing pre-filtering on the mapped signal to convert the mapped signal into a narrowband signal filtered signal. The pre-filtering is finite impulse response filtering. A bandwidth of the narrowband signal filtered signal is less than bandwidth of the mapped signal, and the narrowband signal filtered signal is a baud rate signal. The method also includes performing waveform forming according to the narrowband signal filtered signal to obtain a shaped signal, and performing digital-to-analog conversion on the shaped signal to convert a shaped second signal into an analog signal, and sending the analog signal.

3 Claims, 6 Drawing Sheets

Related U.S. Application Data continuation of application No. PCT/CN2013/084032, filed on Sep. 23, 2013.

(58) Field of Classification Search
USPC .................. 375/229, 224; 370/210; 398/208
See application file for complete search history.

(56) References Cited

U.S. PATENT DOCUMENTS

| | | | |
|---|---|---|---|
| 2006/0092050 A1 | 5/2006 | Djokovic et al. | |
| 2008/0181288 A1* | 7/2008 | Wurzbach | H04L 25/0224 375/224 |
| 2009/0201796 A1* | 8/2009 | Roberts | H04B 10/60 370/210 |
| 2009/0262792 A1 | 10/2009 | Huang et al. | |
| 2011/0188550 A1 | 8/2011 | Wajcer et al. | |
| 2011/0243561 A1 | 10/2011 | Li et al. | |
| 2011/0255586 A1 | 10/2011 | Li et al. | |
| 2014/0233966 A1* | 8/2014 | Yu | H04B 10/613 398/208 |
| 2016/0211939 A1* | 7/2016 | Yu | H04L 27/34 |

FOREIGN PATENT DOCUMENTS

| | | |
|---|---|---|
| CN | 101895492 A | 11/2010 |
| CN | 102165705 A | 8/2011 |
| CN | 102724158 A | 10/2012 |
| JP | 2011223563 A | 11/2011 |
| JP | 2012129688 A | 7/2012 |
| KR | 20040091744 A | 10/2004 |
| WO | 2005086347 A1 | 9/2005 |

OTHER PUBLICATIONS

Cai, Y., "Map Detection for Linear and Nonlinear ISI Mitigation in Long-Haul Coherent Detection Systems," IEEE Photonics Society Summer Topicals 2010, WA1.1 (Invited) 09.00-09.30, Jul. 19-21, 2010, 2 pages.

Li, J. et al., "Approaching Nyquist Limit in WDM Systems by Low-Complexity Receiver-Side Duobinary Shaping," Journal of Lightwave Technology, vol. 30, No. 11, Jun. 1, 2012, 13 pages.

Tipsuwsnnskul, E. et al.: "Performance Comparisons of DP-16QM and Duobinary-Shaped DP-QPSK for Optical Systems With 4.1 Bit/s/Hz Spectral Efficiency," IEEE Journal of Lightwave Technology, Jul. 15, 2012 8 pages, vol. 30, No. 14.

"Finite Impulse Response," Wikipedia, the Free Encyclopedia, Feb. 14, 2013, 8 pages.

Li, J., et al., "Low-Complexity Duobinary Signaling and Detection for Sensitivity Improvement in Nyquist-WDM Coherent System," OFC/NFOEC Technical Digest © 2012 OSA, 4 pages.

Yu, J. et al., "Transmission of 200 G PDM-CSRZ-QPSK and PDM-16 QAM With a SE of 4 b/s/Hz," Journal of Lightwave Technology, vol. 3, No. 4, Feb. 15, 2013, pp. 515-522.

* cited by examiner

METHOD FOR SENDING AND RECEIVING SIGNAL, AND CORRESPONDING DEVICE AND SYSTEM

CROSS-REFERENCE TO RELATED APPLICATIONS

This application is a continuation of U.S. patent application Ser. No. 15/078,717, filed on Mar. 23, 2016, which is a continuation of International Application No. PCT/CN2013/084032, filed on Sep. 23, 2013. The afore-mentioned patent applications are hereby incorporated by reference in their entireties.

TECHNICAL FIELD

This application relates to the communications field, and in particular, to a method for sending and receiving a signal, and a corresponding device and system.

BACKGROUND

In the communications field, as a baud rate of a system increases, bandwidth occupied by a single carrier is increasingly large. Therefore, when bandwidth of hardware of a transmitter and a receiver is insufficient, a signal loss is caused when a signal passes through the transmitter or the receiver, thereby affecting overall performance of the system. For a wavelength division multiplexing system, a signal is generally carried on multiple single carriers with fixed spacing. When bandwidth of a single carrier increases, crosstalk between channels is intensified, and system performance deteriorates.

SUMMARY

This application provides a method for sending and receiving a signal, and a corresponding device and system, which can transmit a high baud rate signal in narrow bandwidth and effectively reduce signal loss.

A first aspect of this application provides a method for sending a signal. The method includes performing constellation mapping on a data stream to obtain a mapped signal, and performing pre-filtering on the mapped signal to convert the mapped signal into a filtered signal. The pre-filtering is finite impulse response filtering, bandwidth of the filtered signal is less than bandwidth of the mapped signal, and the filtered signal is a baud rate signal. The method also includes performing waveform forming according to the filtered signal to obtain a shaped signal; and performing digital-to-analog conversion on the shaped signal to obtain an analog signal, and sending the analog signal.

With reference to the first aspect, in a first possible implementation manner of the first aspect of this application, a formula for implementing the pre-filtering is $D(k)=W_0C(k)+W_1C(k-1)+\ldots+W_{N-1}C(k-N+1)$, where k is a time sequence number, $D(k)$ is the filtered signal, $C(k)$ is the mapped signal, $0 \le i \le N-1$, $N-1$ is a maximum delay amount based on a time unit, $W_i$ is an $i^{th}$ filter coefficient, and $C(k-i)$ is a signal obtained by delaying $C(k)$ by i time units.

A second aspect of this application provides a method for receiving a signal. The method includes performing analog-to-digital conversion on an analog signal to obtain a digital signal, performing equalization and phase retrieval on the digital signal to obtain an equalized and retrieved signal, and performing post-filtering on the equalized and retrieved signal to convert the equalized and retrieved signal into a filtered signal. The post-filtering is finite impulse response filtering, and bandwidth of the equalized and retrieved signal is greater than bandwidth of the filtered signal. The method also includes performing sequence detection on the filtered signal to obtain a sequence signal.

With reference to the second aspect, in a first possible implementation manner of the second aspect of this application, a formula for implementing the post-filtering is $F(k)=\hat{W}_0E(k)+\hat{W}_1E(k-1)+\ldots+\hat{W}_{M-1}E(k-M+1)$, where k is a time sequence number, $F(k)$ is the filtered signal, $E(k)$ the equalized and retrieved signal, $0 \le j \le M-1$, $M-1$ is a maximum delay amount based on a time unit, $\hat{W}_j$ is a $j^{th}$ filter coefficient, and $E(k-j)$ is a signal obtained by delaying $E(k)$ by j time units.

A third aspect of this application provides a transmitter. The transmitter includes a mapping module, a pre-filtering module, a shaping module, and a digital-to-analog conversion module. The mapping module is configured to perform constellation mapping on a data stream to obtain a mapped signal, where the mapping module sends the mapped signal to the pre-filtering module. The pre-filtering module is configured to receive the mapped signal, and perform pre-filtering on the mapped signal to convert the mapped signal into a filtered signal, where the pre-filtering is finite impulse response filtering, bandwidth of the filtered signal is less than bandwidth of the mapped signal, and the filtered signal is a baud rate signal, where the pre-filtering module sends the filtered signal to the shaping module. The shaping module is configured to receive the filtered signal, and perform waveform forming on the filtered signal to obtain a shaped signal, where the shaping module sends the shaped signal to the digital-to-analog conversion module. The digital-to-analog conversion module is configured to receive the shaped signal, perform digital-to-analog conversion on the shaped signal to obtain an analog signal, and send the analog signal.

With reference to the third aspect, in a first possible implementation manner of the third aspect of this application, a formula for implementing the pre-filtering is $D(k)=W_0C(k)+W_1C(k-1)+\ldots+W_{N-1}C(k-N+1)$, where k is a time sequence number, $D(k)$ is the filtered signal, $C(k)$ is the mapped signal, $0 \le i \le N-1$, $N-1$ is a maximum delay amount based on a time unit, $W_i$ is an $i^{th}$ filter coefficient, and $C(k-i)$ is a signal obtained by delaying $C(k)$ by i time units.

A fourth aspect of this application provides a receiver. The receiver includes an analog-to-digital conversion module, an equalization and retrieval module, a post-filtering module, and a sequence detection module. The analog-to-digital conversion module is configured to perform analog-to-digital conversion on an analog signal to obtain a digital signal, where the analog-to-digital conversion module sends the digital signal to the equalization and retrieval module. The equalization and retrieval module is configured to receive the digital signal, and perform equalization and phase retrieval on the digital signal to obtain an equalized and retrieved signal, where the equalization and retrieval module sends the equalized and retrieved signal to the filtering module. The post-filtering module is configured to receive the equalized and retrieved signal, and perform post-filtering on the equalized and retrieved signal to convert the equalized and retrieved signal into a filtered signal, where the post-filtering is finite impulse response filtering, and bandwidth of the equalized and retrieved signal is greater than bandwidth of the filtered signal, where the post-filtering module sends the filtered signal to the sequence detection module. The sequence detection module is configured to receive the filtered signal, and perform sequence detection on the filtered signal to obtain a sequence signal.

With reference to the fourth aspect, in a first possible implementation manner of the fourth aspect of this application, a formula for implementing the post-filtering is $F(k)=\hat{W}_0 E(k)+\hat{W}_1 E(k-1)+ \ldots +\hat{W}_{M-1} E(k-M+1)$, where k is a time sequence number, F(k) is the filtered signal, E(k) is the equalized and retrieved signal, $0 \leq j \leq M-1$, M−1 is a maximum delay amount based on a time unit, $\hat{W}_j$ is a $j^{th}$ filter coefficient, and E(k−j) is a signal obtained by delaying E(k) by j time units.

A fifth aspect of this application provides a transmitter, including a processor and an analog-to-digital converter. The processor is configured to perform constellation mapping on a data stream to obtain a mapped signal, and to perform pre-filtering on the mapped signal to convert the mapped signal into a filtered signal. The pre-filtering is finite impulse response filtering, bandwidth of the filtered signal is less than bandwidth of the mapped signal, and the filtered signal is a baud rate signal. The processor is also configured to perform waveform forming according to the filtered signal to obtain a shaped signal. The analog-to-digital converter is configured to perform digital-to-analog conversion on the shaped signal to obtain an analog signal, and send the analog signal.

With reference to the fifth aspect, in a first possible implementation manner of the fifth aspect of this application, a formula for implementing the pre-filtering by the processor is $D(k)=W_0 C(k)+W_1 C(k-1)+ \ldots +W_{N-1} C(k-N+1)$, where k is a time sequence number, D(k) is the filtered signal, C(k) is the mapped signal, $0 \leq i \leq N-1$, N−1 is a maximum delay amount based on a time unit, $W_i$ is an $i^{th}$ filter coefficient, and C(k−i) is a signal obtained by delaying C(k) by i time units.

A sixth aspect of this application provides a receiver, where the receiver includes an analog-to-digital converter and a processor. The analog-to-digital converter is configured to perform analog-to-digital conversion on an analog signal to obtain a digital signal. The processor is configured to: perform equalization and phase retrieval on the digital signal to obtain an equalized and retrieved signal, The processor is also configured to perform post-filtering on the equalized and retrieved signal to convert the equalized and retrieved signal into a filtered signal, where the post-filtering is finite impulse response filtering, and bandwidth of the equalized and retrieved signal is greater than bandwidth of the filtered signal. The processor is also configured to perform sequence detection on the filtered signal to obtain a sequence signal.

With reference to the sixth aspect, in a first possible implementation manner of the sixth aspect of this application, a formula for implementing the post-filtering by the processor is $F(k)=\hat{W}_0 E(k)+\hat{W}_1 E(k-1)+ \ldots +\hat{W}_{M-1} E(k-M+1)$, where k is a time sequence number, F(k) is the filtered signal, E(k) is the equalized and retrieved signal, $0 \leq j \leq M-1$, M−1 is a maximum delay amount based on a time unit, $\hat{W}_j$ is a $j^{th}$ filter coefficient, and E(k−j) is a signal obtained by delaying E(k) by j time units.

A seventh aspect of this application provides a signal transmission method. The method includes performing, by a transmitter, constellation mapping on a data stream to obtain a mapped signal; performing, by the transmitter, pre-filtering on the mapped signal to convert the mapped signal into a first filtered signal, where the pre-filtering is finite impulse response filtering, bandwidth of the first filtered signal is less than bandwidth of the mapped signal, the first filtered signal is a baud rate signal, and a formula for implementing the pre-filtering is $D(k)=W_0 C(k)+W_1 C(k-1)+ \ldots +W_{N-1} C(k-N+1)$, where k is a time sequence number, D(k) is the first filtered signal, C(k) is the mapped signal, $0 \leq i \leq N-1$, N−1 is a maximum delay amount based on a time unit, $W_i$ is an $i^{th}$ filter coefficient, and C(k−i) is a signal obtained by delaying C(k) by i time units. The method also includes performing, by the transmitter, waveform forming according to the first filtered signal to obtain a shaped signal; performing, by the transmitter, digital-to-analog conversion on the shaped signal to obtain an analog signal, and sending the analog signal; performing, by a receiver, analog-to-digital conversion on the analog signal to obtain a digital signal. The method also includes performing, by the receiver, equalization and phase retrieval on the digital signal to obtain an equalized and retrieved signal. The method also includes performing, by the receiver, post-filtering on the equalized and retrieved signal to convert the equalized and retrieved signal into a second filtered signal, where the post-filtering is finite impulse response filtering, bandwidth of the equalized and retrieved signal is greater than bandwidth of the second filtered signal, and a formula for implementing the post-filtering is $F(k)=\hat{W}_0 E(k)+\hat{W}_1 E(k-1)+ \ldots +\hat{W}_{M-1} E(k-M+1)$, where k is a time sequence number, F(k) is the second filtered signal, E(k) is the equalized and retrieved signal, $0 \leq j \leq M-1$, M−1 is a maximum delay amount based on a time unit, $\hat{W}_j$ is a $j^{th}$ filter coefficient, and E(k−j) is a signal obtained by delaying E(k) by j time units; and performing, by the receiver, sequence detection on the second filtered signal to obtain a sequence signal; where the maximum delay amount M−1 based on a time unit in the formula for implementing the pre-filtering is equal to the maximum delay amount N−1 based on a time unit in the formula for implementing the post-filtering.

An eighth aspect of this application provides a signal transmission system, including a transmitter and a receiver. The transmitter includes a mapping module, a pre-filtering module, a shaping module, and a digital-to-analog conversion module. The mapping module is configured to perform constellation mapping on a data stream to obtain a mapped signal, where the mapping module sends the mapped signal to the pre-filtering module. The pre-filtering module is configured to receive the mapped signal, and perform pre-filtering on the mapped signal to convert the mapped signal into a first filtered signal, where the pre-filtering is finite impulse response filtering, bandwidth of the first filtered signal is less than bandwidth of the mapped signal, the first filtered signal is a baud rate signal, and a formula for implementing the pre-filtering is $D(k)=W_0 C(k)+W_1 C(k-1)+ \ldots +W_{N-1} C(k-N+1)$, where k is a time sequence number, D(k) is the first filtered signal, C(k) is the mapped signal, $0 \leq N-1$, N−1 is a maximum delay amount based on a time unit, $W_i$ is an $i^{th}$ filter coefficient, and C(k−i) is a signal obtained by delaying C(k) by i time units. The pre-filtering module sends the first filtered signal to the shaping module. The shaping module is configured to receive the first filtered signal, and perform waveform forming on the first filtered signal to obtain a shaped signal, where the shaping module sends the shaped signal to the digital-to-analog conversion module. The digital-to-analog conversion module is configured to receive the shaped signal, perform digital-to-analog conversion on the shaped signal to obtain an analog signal, and send the analog signal; the receiver includes an analog-to-digital conversion module, an equalization and retrieval module, a post-filtering module, and a sequence detection module. The analog-to-digital conversion module is configured to perform analog-to-digital conversion on the analog signal to obtain a digital signal, where the analog-to-digital conversion module sends the digital signal to the equalization and retrieval module. The equalization and retrieval module is configured to receive the digital signal, and perform equalization and phase retrieval on the digital signal to obtain an equalized and retrieved signal, where the equalization and retrieval module sends the equalized and retrieved signal to the filtering module. The post-filtering module is configured to receive the equalized and retrieved signal, and perform post-filtering on the equalized and retrieved signal to convert the equalized and retrieved signal into a second filtered signal, where the post-filtering is finite impulse response filtering, bandwidth of the equalized and retrieved signal is greater than bandwidth of the second filtered signal, and a formula for implementing the post-filtering is $F(k)=\hat{W}_0 E(k)+\hat{W}_1 E(k-1)+ \ldots +\widetilde{\hat{W}_{M-1}} E(k-M+1)$, where k is a time sequence number, F(k) is the second filtered signal, E(k) is the equalized and retrieved signal, $0 \leq j \leq M-1$, M−1 is a maximum delay amount based on a time unit, $\hat{W}_j$ is a $j^{th}$ filter coefficient, and E(k−j) is a signal obtained by delaying E(k) by j time units. The post-filtering module sends the second filtered signal to the sequence detection module. The sequence detection module is configured to receive the second filtered signal, and perform sequence detection on the second filtered signal to obtain a sequence signal. The maximum delay amount M−1 based on a time unit in the formula for implementing the pre-filtering is equal to the maximum delay amount N−1 based on a time unit in the formula for implementing the post-filtering.

A ninth aspect of this application provides a signal transmission system, including a transmitter and a receiver. The transmitter includes a first processor and an analog-to-digital converter; the first processor is configured to perform constellation mapping on a data stream to obtain a mapped signal. The processor is also configured to perform pre-filtering on the mapped signal to convert the mapped signal into a first filtered signal, where the pre-filtering is finite impulse response filtering, bandwidth of the first filtered signal is less than bandwidth of the mapped signal, and the first filtered signal is a baud rate signal. The processor is also configured to perform waveform forming according to the first filtered signal to obtain a shaped signal; where a formula for implementing the pre-filtering by the first processor is $D(k)=W_0 C(k)+W_1 C(k-1)+ \ldots +W_{N-1} C(k-N+1)$, where k is a time sequence number, D(k) is the first filtered signal, C(k) is the mapped signal, $0 \leq i \leq N-1$, N−1 is a maximum delay amount based on a time unit, $W_i$ is an $i^{th}$ filter coefficient, and C(k−i) is a signal obtained by delaying C(k) by i time units. The analog-to-digital converter is configured to perform digital-to-analog conversion on the shaped signal to obtain an analog signal, and send the analog signal; the receiver includes an analog-to-digital converter and a second processor. The analog-to-digital converter is configured to perform analog-to-digital conversion on the analog signal to obtain a digital signal. The second processor is configured to: perform equalization and phase retrieval on the digital signal to obtain an equalized and retrieved signal; perform post-filtering on the equalized and retrieved signal to convert the equalized and retrieved signal into a second filtered signal, where the post-filtering is finite impulse response filtering, and bandwidth of the equalized and retrieved signal is greater than bandwidth of the second filtered signal; and perform sequence detection on the second filtered signal to obtain a sequence signal; where a formula for implementing the post-filtering by the second processor is $F(k)=\hat{W}_0 E(k)+\hat{W}_1 E(k-1)+ \ldots +\widetilde{\hat{W}_{M-1}} E(k-M+1)$, where k is a time sequence number, F(k) is the second filtered signal, E(k) is the equalized and retrieved signal, $0 \leq j \leq M-1$, M−1 is a maximum delay amount based on a time unit, $\hat{W}_j$ is a $j^{th}$ filter coefficient, and E(k−j) is a signal obtained by delaying E(k) by j time units; where the maximum delay amount M−1 based on a time unit in the formula for implementing the pre-filtering is equal to the maximum delay amount N−1 based on a time unit in the formula for implementing the post-filtering.

In the foregoing solutions, a manner of pre-filtering is used on a transmitter to convert a broadband signal into a narrowband signal, so that a signal loss can be reduced when the narrowband signal passes through a digital-to-analog converter whose bandwidth is also narrow. A manner of post-filtering is used on a receiver to filter noise, controllable intersymbol interference (ISI) corresponding to the transmitter is introduced, and then sequence detection is performed. White noise, superposed on a channel, of a transmitted signal is amplified by using channel equalization, and is suppressed after post-filtering. In addition, the broadband signal is converted into the narrowband signal in a filtering manner, which introduces controllable intersymbol interference; intersymbol interference can be canceled by using sequence detection in the receiver, thereby improving system performance.

BRIEF DESCRIPTION OF THE DRAWINGS a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

In the following description, to illustrate rather than limit, specific details such as a particular system structure, an interface, and a technology are provided to make a thorough understanding of this application. However, a person skilled in the art should know that this application may be practiced in other implementation manners without these specific details. In other cases, detailed descriptions of well-known apparatuses, circuits, and methods are omitted, so that this application is described without being obscured by unnecessary details.

Figure 1:
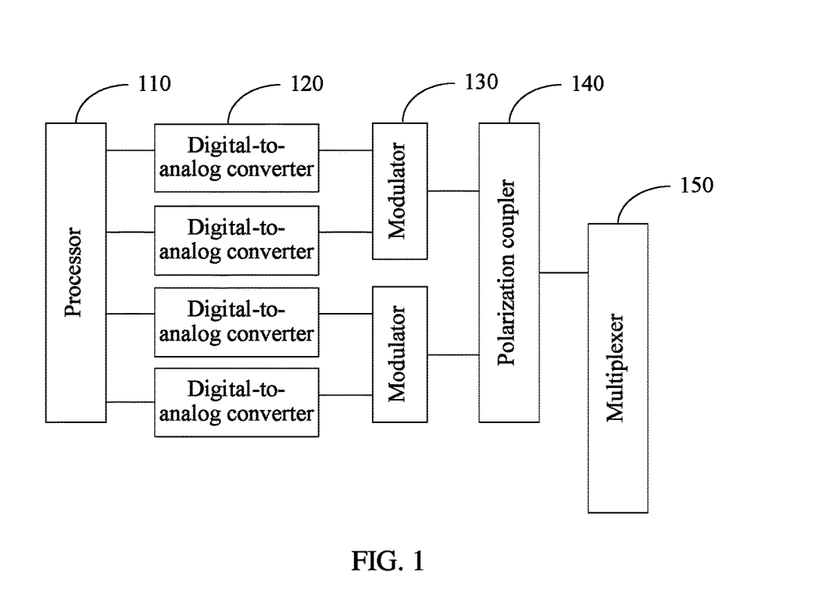
FIG. 1 is a schematic structural diagram of an implementation manner of a transmitter according to this application.
Figure 2:
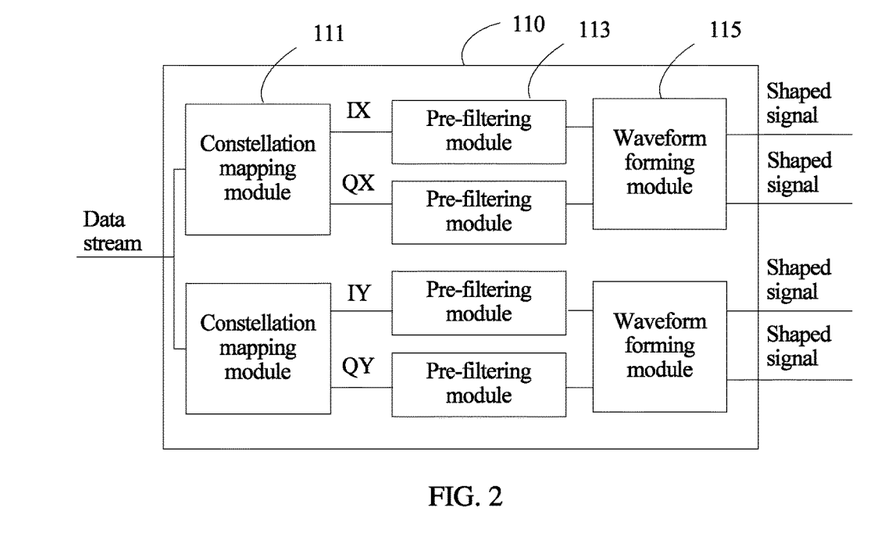
FIG. 2 is a schematic diagram of module partition of an implementation manner of a processor of a transmitter according to this application.

FIG. 1 is a schematic structural diagram of an implementation manner of a transmitter according to this application, and FIG. 2 is a schematic diagram of module partition of an implementation manner of a processor of a transmitter according to this application. That is, FIG. 2 further elaborates a processor 110 in FIG. 1. A polarization multiplexing coherence system is used in this implementation manner; therefore, the transmitter includes the processor 110, a digital-to-analog converter 120, a modulator 130, a polarization coupler 140, and a multiplexer 150 that are sequentially connected. The processor 110 includes a constellation mapping module 111, a pre-filtering module 113, a waveform forming module 115, and the like.

A data stream is sent to the processor 110 for processing, where the data stream is split into two data streams, which are respectively input to a first constellation mapping module 111 and a second constellation mapping module 111. For example, a data stream "01 01 00 10 10 10 10 10 . . . " is split into two data streams in a manner of interleaving by using two bits as a group, where a first data stream is "01 00 10 10 . . . " and a second data stream is "01 10 10 10 . . . ". Definitely, there are also many manners of allocating a data stream, which are not enumerated herein.

It may be set that "00" is mapped to a constellation point 1+j, "01" is mapped to a constellation point −1+j, "10" is mapped to a constellation point −1−j, and "11" is mapped to a constellation point 1−j. Then, the first data stream is "01 00 10 10 . . . ", which are respectively mapped to "−1+j, 1+j, −1−j, −1−j . . . ". A real part and an imaginary part of each constellation point are separated as two outputs, and it may be obtained that a first mapped signal IX of an output real part is "−1, 1, −1, −1 . . . ", and a second mapped signal QX of an output imaginary part is "1, 1, −1, −1 . . . ". Likewise, after constellation mapping is performed on the second data stream, a third mapped signal W of a real part and a fourth mapped signal QY of an imaginary part can be obtained. Therefore, four mapped signals can be obtained from the two data streams. There are many constellation mapping manners. That two bits are used as a group in the foregoing is merely used as an example for description. Alternatively, in another implementation manner, three bits or four bits may be used as a group for constellation mapping, which is not enumerated herein.

After constellation mapping, each mapped signal is sent to a pre-filtering module 113 for pre-filtering, to respectively convert the four mapped signals into four filtered signals. That is, a first mapped signal is sent to a first pre-filtering module 113, a second mapped signal is sent to a second pre-filtering module 113, a third mapped signal is sent to a third pre-filtering module 113, and a fourth mapped signal is sent to a fourth pre-filtering module 113. The pre-filtering is finite impulse response filtering, bandwidth of the filtered signal is less than bandwidth of the mapped signal, and the filtered signal is a baud rate signal. Therefore, after the pre-filtering, when compared with the corresponding mapped signal, the filtered signal has no information loss but occupies narrower bandwidth.

After the pre-filtering, waveform forming is performed on the four filtered signals to accordingly obtain four shaped signals. The first filtered signal and the second filtered signal are input to a first waveform forming module 115 to respectively obtain a first shaped signal and a second shaped signal, and the third filtered signal and the fourth filtered signal are input to a second waveform forming module 115 to respectively obtain a third shaped signal and a fourth shaped signal. For example, a first filtered signal is "−1, 1, −1, −1 . . . "; at a time at a time when a valuevalue is "−1", a negative rectangular wave is output, or at a time when a value is "1", a positive rectangular wave is output. In another manner, an output rectangular wave may be a Gaussian wave, a sine wave, or the like. To obtain a better transmitting effect, compensation for a transmit end may further be performed during shaping.

The first shaped signal is input to a first digital-to-analog converter 120 for digital-to-analog conversion to obtain a first analog signal; the second shaped signal is input to a second digital-to-analog converter 120 for digital-to-analog conversion to obtain a second analog signal; the third shaped signal is input to a third digital-to-analog converter 120 for digital-to-analog conversion to obtain a third analog signal; the fourth shaped signal is input to a fourth digital-to-analog converter 120 for digital-to-analog conversion to obtain a fourth analog signal. Because the bandwidth of the filtered signal is less than bandwidth of data that is allowed to pass through the digital-to-analog converter 120, a signal loss does not occur.

Then, the first analog signal and the second analog signal are transported to a first modulator 130 for modulation to obtain a first modulated signal, and the third analog signal and the fourth analog signal are transported to a second modulator 130 for modulation to obtain a second modulated signal. Then, the first modulated signal and the second modulated signal are sent to the polarization coupler 140 to be coupled into one signal, the signal is sent to the multiplexer 150 to be coupled with a signal of another channel, and a coupled signal is input to a transport optical fiber.

Figure 3:
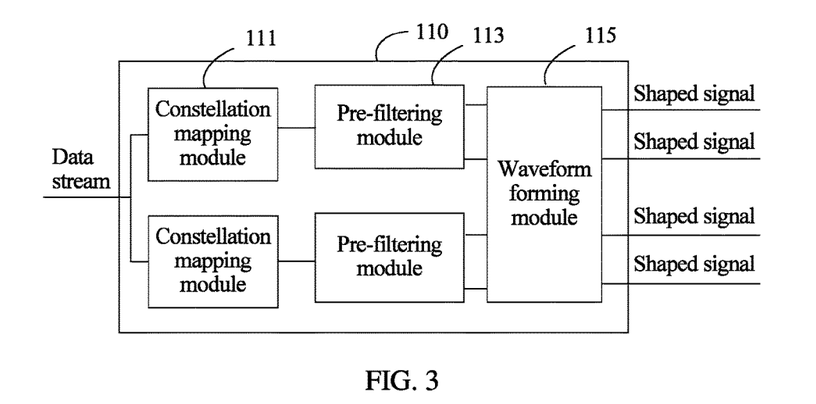
FIG. 3 is a schematic diagram of module partition of another implementation manner of a processor of a transmitter according to this application.

FIG. 3 is a schematic diagram of module partition of another implementation manner of a processor of a transmitter according to this application. A polarization multiplexing coherence system is also used in this implementation manner. A difference of FIG. 3 from FIG. 2 lies in that a first data stream, after undergoing constellation mapping, is output as a first mapped signal in a complex number form of "−1+j, 1+j, −1−j, −1−j". A second data stream, after undergoing constellation mapping, is also output as a second mapped signal in a complex number form. Therefore, two mapped signals can be obtained from the two data streams. The first mapped signal is sent to a first pre-filtering module 113 for filtering to obtain two filtered signals: a first filtered signal and a second filtered signal. The second mapped signal is sent to a second pre-filtering module 113 for filtering to obtain two filtered signals: a third filtered signal and a fourth filtered signal. The four filtered signals are sent to a same waveform forming module 115 for waveform forming to respectively obtain corresponding four shaped signals.

Figure 4:
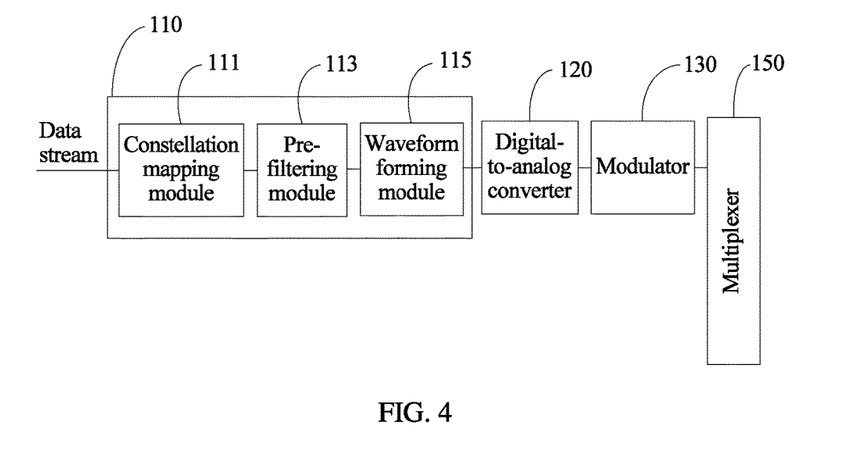
FIG. 4 is a schematic structural diagram of another implementation manner of a transmitter according to this application.

FIG. 4 is a schematic structural diagram of another implementation manner of a transmitter according to this application. In a direct detection system of non-polarization multiplexing coherence, a data stream is directly sent to a constellation mapping module in for constellation mapping to obtain a mapped signal; the mapped signal is sent to a pre-filtering module 113 to obtain a filtered signal; the filtered signal is input to a waveform forming module 115 for waveform forming to obtain a shaped signal; the shaped signal is input to a digital-to-analog converter 120 for digital-to-analog conversion to obtain an analog signal; the analog signal is transported to a modulator 130 for modulation to obtain a modulated signal; the modulated signal is sent to a multiplexer 150 to be coupled with a signal of another channel, and a coupled signal is input to a transport optical fiber.

Figure 5:
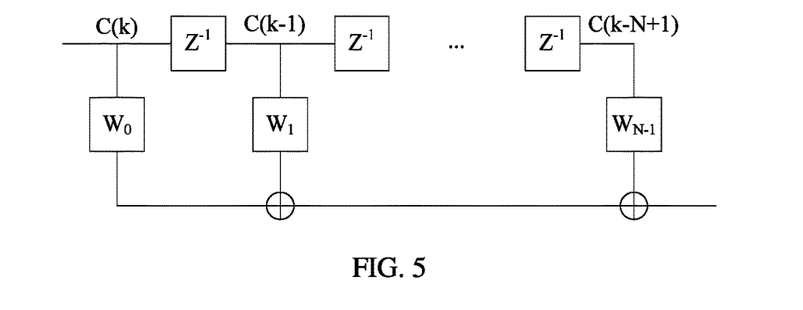
FIG. 5 is a schematic structural diagram of a pre-filter of a transmitter according to this application.

Referring to FIG. 5, FIG. 5 is a schematic structural diagram of a pre-filter of a transmitter according to this application. A formula for implementing the pre-filtering is $D(k)=W_0C(k)+W_1C(k-1)+\ldots+W_{N-1}C(k-N+1)$, where k is a time sequence number, D(k) is the filtered signal, C(k) is the mapped signal, $0 \leq i \leq N-1$, N−1 is a maximum delay amount based on a time unit, $W_i$ is an $i^{th}$ filter coefficient, and C(k−i) is a signal obtained by delaying C(k) by i time units. $W_i$ can be obtained by specifically optimizing a transmission system.

The transmitter in the foregoing solutions converts a broadband mapped signal into a narrowband filtered signal by using a filter, so that the filtered signal can smoothly pass through a digital-to-analog converter whose bandwidth is also narrow, thereby reducing signal damages caused due to insufficient bandwidth of a device.

Figure 6:
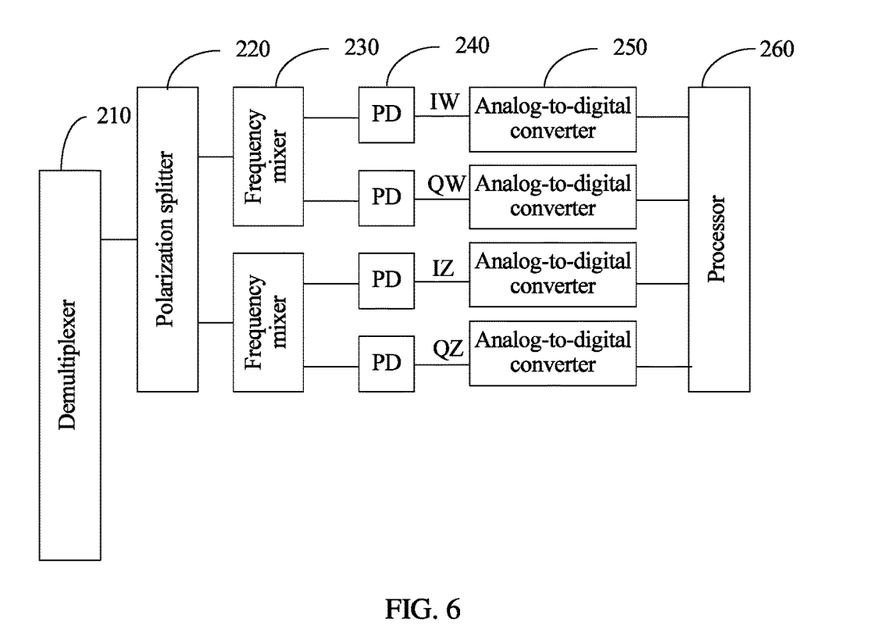
FIG. 6 is a schematic structural diagram of an implementation manner of a receiver according to this application.
Figure 7:
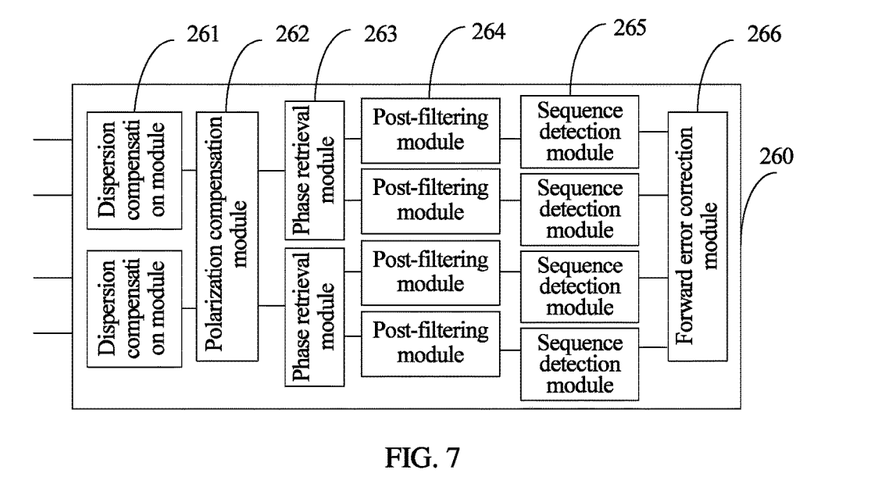
FIG. 7 is a schematic diagram of module partition of an implementation manner of a processor of a receiver according to this application.

FIG. 6 is a schematic structural diagram of an implementation manner of a receiver according to this application, and FIG. 7 is a schematic diagram of module partition of an implementation manner of a processor of a receiver according to this application. That is, FIG. 7 further elaborates a processor 260 in FIG. 6. A polarization multiplexing coherence system is used in this implementation manner. Therefore, the receiver includes a demultiplexer 210, a polarization splitter 220, a frequency mixer 230, an opto-electronic detector 240, an analog-to-digital converter 250, and the processor 260. The processor 260 includes a dispersion compensation module 261, a polarization compensation module 262, a phase retrieval module 263, a post-filtering module 264, a sequence detection module 265, and a forward error correction module 266.

The demultiplexer 210 decouples a received optical signal to obtain a first optical signal, and the first optical signal is split into a first modulated signal and a second modulated signal by the polarization splitter 220. The first modulated signal is input to a first frequency mixer 230. The first frequency mixer 230, a first opto-electronic detector 240, and a second opto-electronic detector 240 restore the high-frequency first modulated signal to a first analog signal and a second analog signal that are of low-frequency baseband. The second modulated signal is input to a second frequency mixer 230. The second frequency mixer 230, a third opto-electronic detector 240, and a fourth opto-electronic detector 240 restore the high-frequency second modulated signal to a third analog signal and a fourth analog signal that are of low-frequency baseband.

The first analog signal is sent to a first analog-to-digital converter 250 for analog-to-digital conversion to obtain a first digital signal; the second analog signal is sent to a second analog-to-digital converter 250 for analog-to-digital conversion to obtain a second digital signal; the third analog signal is sent to a third analog-to-digital converter 250 for analog-to-digital conversion to obtain a third digital signal; the fourth analog signal is sent to a fourth analog-to-digital converter 250 for analog-to-digital conversion to obtain a fourth digital signal.

After the four digital signals are obtained, equalization and phase retrieval are performed on the digital signal to obtain an equalized and retrieved signal. Specifically, the first digital signal and the second digital signal are input to a first dispersion compensation module 261 for dispersion compensation to obtain a first dispersion compensation signal, and the third digital signal and the fourth digital signal are input to a second dispersion compensation module 261 for dispersion compensation to obtain a second dispersion compensation signal. The first dispersion compensation signal and the second dispersion compensation signal are both input to the same polarization compensation module 262 for polarization compensation to obtain a first polarization compensation signal and a second polarization compensation signal. The first polarization compensation signal is sent to a first phase retrieval module 263 to obtain a first equalized and retrieved signal and a second equalized and retrieved signal, and the second polarization compensation signal is sent to a second phase retrieval module 263 to obtain a third equalized and retrieved signal and a fourth equalized and retrieved signal.

The first equalized and retrieved signal is sent to a first post-filtering module 264 for post-filtering to obtain a first filtered signal; the second equalized and retrieved signal is sent to a second post-filtering module 264 for post-filtering to obtain a second filtered signal; the third equalized and retrieved signal is sent to a third post-filtering module 264 for post-filtering to obtain a third filtered signal; the fourth equalized and retrieved signal is sent to a fourth post-filtering module 264 for post-filtering to obtain a fourth filtered signal.

The first filtered signal is sent to a first sequence detection module 265 for sequence detection to obtain a first sequence signal; the second filtered signal is sent to a second sequence detection module 265 for sequence detection to obtain a second sequence signal; the third filtered signal is sent to a third sequence detection module 265 for sequence detection to obtain a third sequence signal; the fourth filtered signal is sent to a fourth sequence detection module 265 for sequence detection to obtain a fourth sequence signal.

The obtained four sequence signals are all sent to the forward error correction module 266 for forward error correction to obtain a final signal.

Figure 8:
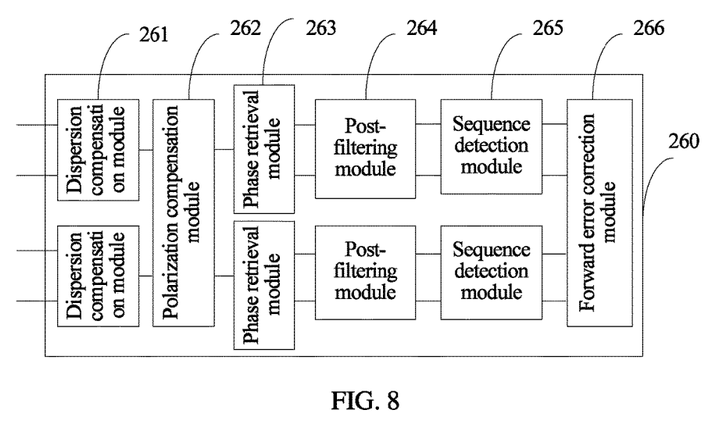
FIG. 8 is a schematic diagram of module partition of another implementation manner of a processor of a receiver according to this application.

FIG. 8 is a schematic diagram of module partition of another implementation manner of a processor of a receiver according to this application. A polarization multiplexing coherence system is also used in this implementation manner. A difference of FIG. 8 from FIG. 7 lies in that a first equalized and retrieved signal and a second equalized and retrieved signal are sent to a first post-filtering module 264 for post-filtering to respectively obtain a first filtered signal and a second filtered signal; a third equalized and retrieved signal and a fourth equalized and retrieved signal are sent to a second post-filtering module 264 for post-filtering to respectively obtain a third filtered signal and a fourth filtered signal.

The first filtered signal and the second filtered signal are sent to a first sequence detection module 265 for sequence detection to respectively obtain a first sequence signal and a second sequence signal. The third filtered signal and the fourth filtered signal are sent to a second sequence detection module 265 for sequence detection to respectively obtain a third sequence signal and a fourth sequence signal.

Figure 9:
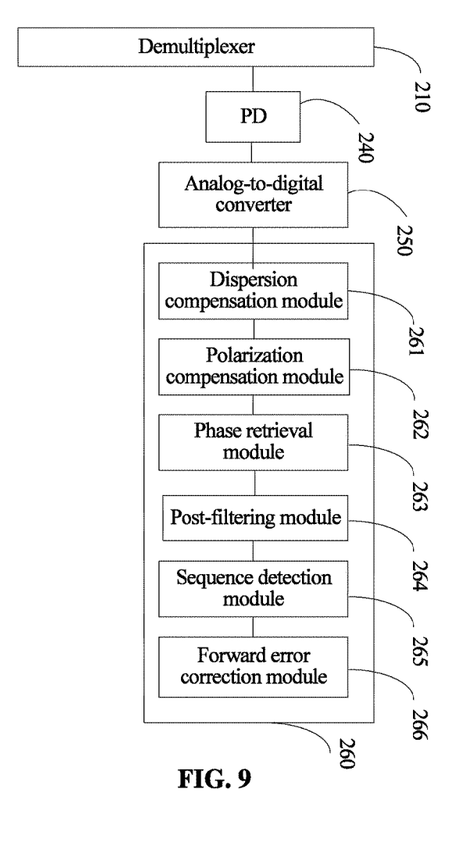
FIG. 9 is a schematic structural diagram of another implementation manner of a receiver according to this application.

FIG. 9 is a schematic structural diagram of another implementation manner of a receiver according to this application. In a direct detection system of non-polarization multiplexing coherence, a demultiplexer 210 decouples a received optical signal to obtain an optical signal, and the optical signal is converted into an analog signal by using an opto-electronic detector 240. The analog signal is sent to an analog-to-digital converter 250 for analog-to-digital conversion to obtain a digital signal. After four digital signals are obtained, equalization and phase retrieval are performed on the digital signal to obtain an equalized and retrieved signal. Specifically, the digital signal is input to a dispersion compensation module 261 for dispersion compensation to obtain a dispersion compensation signal. The dispersion compensation signal is input to a polarization compensation module 262 for polarization compensation to obtain a polarization compensation signal. The polarization compensation signal is sent to a phase retrieval module 263 to obtain an equalized and retrieved signal.

The equalized and retrieved signal is sent to a post-filtering module 264 for post-filtering to obtain a filtered signal. The filtered signal is sent to a sequence detection module 265 for sequence detection to obtain a sequence signal. The obtained sequence signal is sent to a forward error correction module 266 for forward error correction to obtain a final signal.

Figure 10:
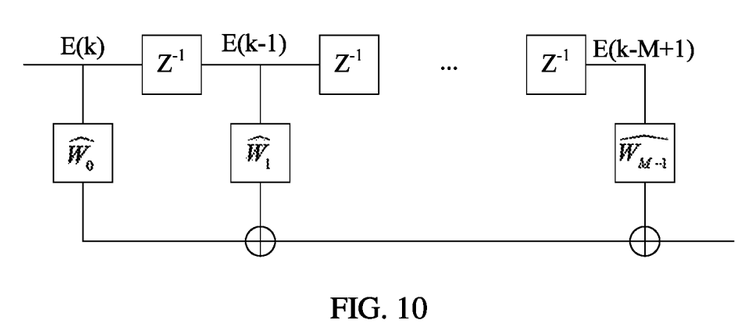
FIG. 10 is a schematic structural diagram of a post-filter of a receiver according to this application.

FIG. 10 is a schematic structural diagram of a post-filter of a receiver according to this application. When a processor 260 performs post-filtering on an equalized and retrieved signal to convert the equalized and retrieved signal into a filtered signal, a formula for implementing the post-filtering is $F(k)=\hat{W}_0 E(k)+\hat{W}_1 E(k-1)+ \ldots +\hat{W}_{M-1} E(k-M+1)$, where k is a time sequence number, $F(k)$ is the narrowband signal, $E(k)$ is the equalized and retrieved signal, $0 \leq j \leq M-1$, $M-1$ is a maximum delay amount based on a time unit, $\hat{W}_j$ is a $j^{th}$ filter coefficient, and $E(k-j)$ is a signal obtained by delaying $E(k)$ by j time units. $\hat{W}_j$ is determined by a pre-filter and a system, where a manner of the determining may be a training sequence manner or a noise spectrum analysis manner. After the post-filtering, noise is suppressed.

When the processor 260 performs sequence detection on the narrowband signal to obtain a sequence signal, an algorithm used for the sequence detection is a Viterbi algorithm or a BCJR algorithm. Because in the sequence detection, a decision is made for all received signals, intersymbol interference can be effectively suppressed.

In the foregoing solutions, a post-filtering manner is used on a receiver to filter noise, controllable intersymbol interference (ISI) corresponding to a transmitter is introduced, and then sequence detection is performed. White noise, superposed on a channel, of a transmitted signal is amplified by using channel equalization, and is suppressed after post-filtering. In addition, a broadband signal is converted into a narrowband signal in a filtering manner, which introduces controllable intersymbol interference; intersymbol interference can be canceled by using sequence detection in the receiver, thereby improving system performance.

Figure 11:
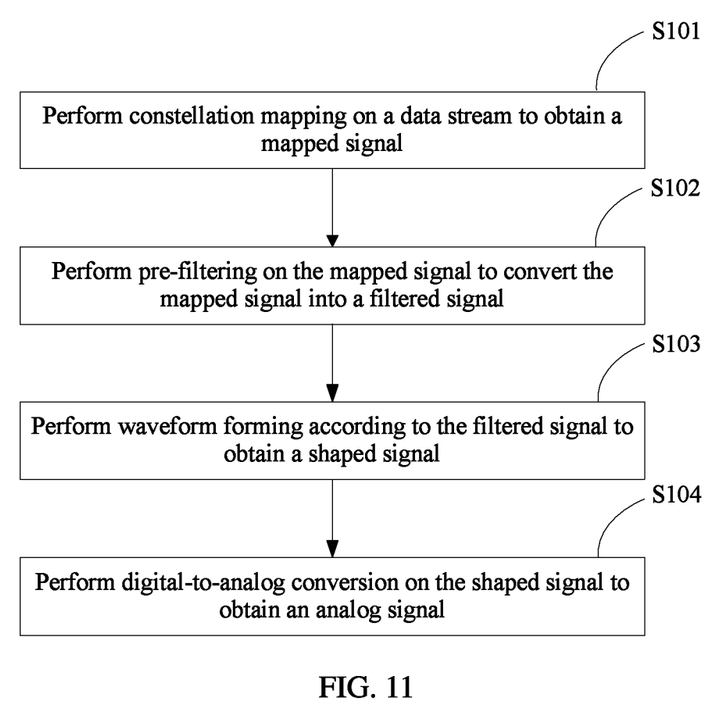
FIG. 11 is a flowchart of an implementation manner of a method for sending a signal according to this application.

FIG. 11 is a flowchart of an implementation manner of a method for sending a signal according to this application. The method for sending a signal in this implementation manner includes the following steps.

S101. A transmitter performs constellation mapping on a data stream to obtain a mapped signal.

The data stream is split into two data streams, on which constellation mapping is separately performed to obtain mapped signals. For example, a data stream "01 01 00 10 10 10 10 10 . . . " is split into two data streams in a manner of interleaving by using two as a group, where a first data stream is "01 00 10 10 . . . " and a second data stream is "01 10 10 10 . . . ". Definitely, there are many manners of allocating a data stream, which are not enumerated herein.

It may be preset that "00" is mapped to a constellation point 1+j, "01" is mapped to a constellation point −1+j, "10" is mapped to a constellation point −1−j, and "11" is mapped to a constellation point 1−j. Then, the first data stream is "01 00 10 10 . . . ", which are respectively mapped to "−1+j, 1+j, −1−j, −1−j . . . ". A real part and an imaginary part of each constellation point are separated as two outputs, and it may be obtained that a first mapped signal of an output real part is "−1, 1, −1, −1 . . . ", and a second mapped signal of an output imaginary part is "1, 1, −1, −1 . . . ". Likewise, after constellation mapping is performed on the second data stream, a third mapped signal of a real part and a fourth mapped signal of an imaginary part can be obtained. Therefore, four mapped signals can be obtained from the two data streams. There are also many other manners of constellation mapping. That two bits are used as a group in the foregoing is merely used as an example for description. Alternatively, in another implementation manner, three bits or four bits may be used as a group for constellation mapping, which is not enumerated herein.

S102. The transmitter performs pre-filtering on the mapped signal to convert the mapped signal into a filtered signal.

After constellation mapping, each mapped signal is sent to a pre-filtering module for pre-filtering to split the four mapped signals into four filtered signals. That is, a first mapped signal is sent to a first pre-filtering module, a second mapped signal is sent to a second pre-filtering module, a third mapped signal is sent to a third pre-filtering module, and a fourth mapped signal is sent to a fourth pre-filtering module. The pre-filtering is finite impulse response filtering, bandwidth of the filtered signal is less than bandwidth of the mapped signal, and the filtered signal is a baud rate signal. Therefore, after the pre-filtering, when compared with the corresponding mapped signal, the filtered signal has no information loss but occupies narrower bandwidth. A formula for implementing the pre-filtering is $D(k)=W_0 C(k)+W_1 C(k-1)+ \ldots +W_{N-1} C(k-N+1)$, where k is a time sequence number, $D(k)$ is the filtered signal, $C(k)$ is the mapped signal, $0 \leq i \leq N-1$, $N-1$ is a maximum delay amount based on a time unit, $W_i$ is an $i^{th}$ filter coefficient, and $C(k-i)$ is a signal obtained by delaying $C(k)$ by i time units. $W_i$ can be obtained according to specific optimization of a transmission system.

S103. The transmitter performs waveform forming according to the filtered signal to obtain a shaped signal.

After the pre-filtering, waveform forming is performed on the four filtered signals to accordingly obtain four shaped signals. The first filtered signal and the second filtered signal are input to a first waveform forming module to respectively obtain a first shaped signal and a second shaped signal, and the third filtered signal and the fourth filtered signal are input to a second waveform forming module to respectively obtain a third shaped signal and a fourth shaped signal. For example, a filtered signal is "−1, 1, −1, −1 . . . "; at a time when a value is "−1", a negative rectangular wave is output, or at a time when a value is "1", a positive rectangular wave is output. In another manner, an output rectangular wave may be a Gaussian wave, a sine wave, or the like. In order to obtain a better transmitting effect, compensation for a transmit end may further be performed during shaping.

S104. The transmitter performs digital-to-analog conversion on the shaped signal to obtain an analog signal, and sends the analog signal.

The first shaped signal is input to a first digital-to-analog converter for digital-to-analog conversion to obtain a first analog signal; the second shaped signal is input to a second digital-to-analog converter for digital-to-analog conversion to obtain a second analog signal; the third shaped signal is input to a third digital-to-analog converter for digital-to-analog conversion to obtain a third analog signal; the fourth shaped signal is input to a fourth digital-to-analog converter for digital-to-analog conversion to obtain a fourth analog signal. Because the bandwidth of the filtered signal is less than bandwidth of data that is allowed to pass through the digital-to-analog converter, a signal loss does not occur. Then, the analog signal is transported to a modulator for modulation to obtain a modulated signal. The modulated signal is sent to a multiplexer to be coupled with a signal of another channel, and a coupled signal is input to a transport optical fiber.

The transmitter in the foregoing solutions converts a broadband mapped signal into a narrowband filtered signal by using a filter, so that the filtered signal can smoothly pass through a digital-to-analog converter whose bandwidth is also narrow, thereby reducing signal damages caused due to insufficient bandwidth of a device.

Figure 12:
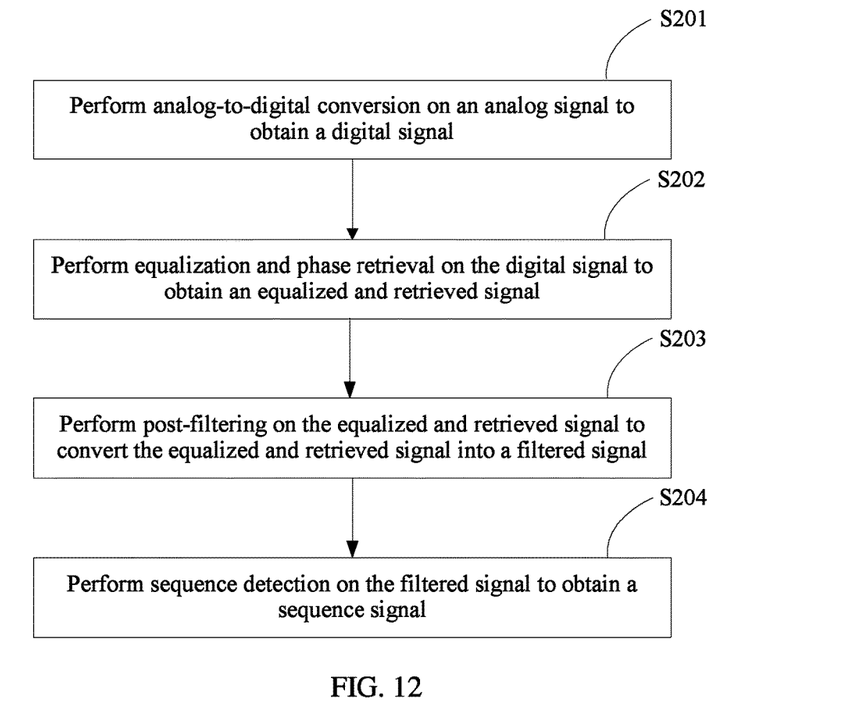
FIG. 12 is a flowchart of an implementation manner of a method for receiving a signal according to this application.

Referring to FIG. 12, FIG. 12 is a flowchart of an implementation manner of a method for receiving a signal according to this application. The method for receiving a signal in this implementation manner includes:

S201. A receiver performs analog-to-digital conversion on an analog signal to obtain a digital signal.

A demultiplexer decouples a received optical signal to obtain a first optical signal, and the first optical signal is split into a first modulated signal and a second modulated signal by a polarization splitter. The first modulated signal is input to a first frequency mixer. The first frequency mixer, a first opto-electronic detector, and a second opto-electronic detector restore the high-frequency first modulated signal to a first analog signal and a second analog signal that are of low-frequency baseband. The second modulated signal is input to a second frequency mixer. The second frequency mixer, a third opto-electronic detector, and a fourth opto-electronic detector restore the high-frequency second modulated signal to a third analog signal and a fourth analog signal that are of low-frequency baseband. Then, analog-to-digital conversion is performed on the analog signal to convert the analog signal into a digital signal.

S202. The receiver performs equalization and phase retrieval on the digital signal to obtain an equalized and retrieved signal.

After four digital signals are obtained, equalization and phase retrieval are performed on the digital signal to obtain an equalized and retrieved signal. Specifically, a first digital signal and a second digital signal are input to a first dispersion compensation module for dispersion compensation to obtain a first dispersion compensation signal, and a third digital signal and a fourth digital signal are input to a second dispersion compensation module for dispersion compensation to obtain a second dispersion compensation signal. The first dispersion compensation signal and the second dispersion compensation signal are both input to the same polarization compensation module for polarization compensation to obtain a first polarization compensation signal and a second polarization compensation signal. The first polarization compensation signal is sent to a first phase retrieval module to obtain a first equalized and retrieved signal and a second equalized and retrieved signal, and the second polarization compensation signal is sent to a second phase retrieval module to obtain a third equalized and retrieved signal and a fourth equalized and retrieved signal.

S203: The receiver performs post-filtering on the equalized and retrieved signal to convert the equalized and retrieved signal into a filtered signal.

The first equalized and retrieved signal is sent to a first post-filtering module 264 for post-filtering to obtain a first filtered signal; the second equalized and retrieved signal is sent to a second post-filtering module 264 for post-filtering to obtain a second filtered signal; the third equalized and retrieved signal is sent to a third post-filtering module 264 for post-filtering to obtain a third filtered signal; the fourth equalized and retrieved signal is sent to a fourth post-filtering module 264 for post-filtering to obtain a fourth filtered signal.

When post-filtering is being performed on the equalized and retrieved signal to convert the equalized and retrieved signal into the filtered signal, a formula for implementing the post-filtering is $F(k)=\hat{W}_0 E(k)+\hat{W}_1 E(k-1)+ \ldots +\hat{W}_{M-1} E(k-M+1)$, where is a time sequence number, $F(k)$ is the filtered signal, $E(k)$ is the equalized and retrieved signal, $0 \leq j \leq M-1$, $M-1$ is a maximum delay amount based on a time unit, $\hat{W}_j$ is a $j^{th}$ filter coefficient, and $E(k-j)$ is a signal obtained by delaying $E(k)$ by j time units. $\hat{W}_j$ is determined by a pre-filter and a system, where a manner of the determining may be a training sequence manner or a noise spectrum analysis manner. After the post-filtering, noise is suppressed.

S204. The receiver performs sequence detection on the filtered signal to obtain a sequence signal.

When sequence detection is being performed on the filtered signal to obtain the sequence signal, an algorithm used for the sequence detection is a Viterbi algorithm or a BCJR algorithm. Because in the sequence detection, a decision is made for all received signals, intersymbol interference can be effectively suppressed.

In the foregoing solutions, a manner of post-filtering is used on a receiver to filter noise, controllable intersymbol interference (ISI) corresponding to a transmitter is introduced, and then sequence detection is performed. White noise, superposed on a channel, of a transmitted signal is amplified by using channel equalization, and is suppressed after post-filtering. In addition, a broadband signal is converted into a narrowband signal in a filtering manner, which introduces controllable intersymbol interference; intersymbol interference can be canceled by using sequence detection in the receiver, thereby improving system performance.

Figure 13:
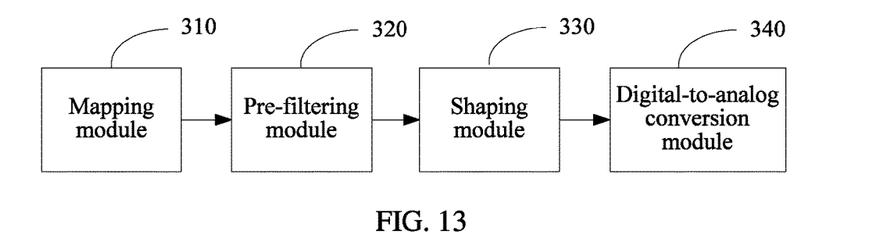
FIG. 13 is a schematic structural diagram of another implementation manner of a transmitter according to this application.

Referring to FIG. 13, FIG. 13 is a schematic structural diagram of another implementation manner of a transmitter according to this application. The transmitter in this implementation manner includes a mapping module 310, a pre-filtering module 320, a shaping module 330, and a digital-to-analog conversion module 340.

The mapping module 310 is configured to perform constellation mapping on a data stream to obtain a mapped signal. For example, a data stream is split into two data streams, on which constellation mapping is separately performed to obtain mapped signals. For example, a data stream "01 01 00 10 10 10 10 10 . . . " is split into two data streams in a manner of interleaving by using two as a group, where a first data stream is "01 00 10 10 . . . " and a second data stream is "01 10 10 10 . . . ". Definitely, there are also many other manners of allocating a data stream, which are not enumerated herein.

It may be set that "00" is mapped to a constellation point 1+j, "01" is mapped to a constellation point −1+j, "10" is mapped to a constellation point −1−j, and "11" is mapped to a constellation point 1−j. Then, the first data stream is "01 00 10 10 . . . ", which are respectively mapped to "−1+j, 1+j, −1−j, −1−j . . . ". A real part and an imaginary part of each constellation point are separated as two outputs, and it may be obtained that a first mapped signal of an output real part is "−1, 1, −1, −1 . . . ", and a second mapped signal of an output imaginary part is "1, 1, −1, −1 . . . ". Likewise, after constellation mapping is performed on the second data stream, a third mapped signal of a real part and a fourth mapped signal of an imaginary part can be obtained. Therefore, four mapped signals can be obtained from the two data streams. There are also many other manners of constellation mapping. That two bits are used as a group in the foregoing is merely used as an example for description. Alternatively, in another implementation manner, three bits or four bits may be used as a group for constellation mapping, which is not enumerated herein. The mapping module 310 sends the mapped signal to the pre-filtering module 320.

The pre-filtering module 320 is configured to receive the mapped signal and perform pre-filtering on the mapped signal to convert the mapped signal into a filtered signal. For example, after constellation mapping, a mapped signal is sent to a pre-filtering module for pre-filtering to convert the mapped signal into a filtered signal. The pre-filtering is finite impulse response filtering, bandwidth of the filtered signal is less than bandwidth of the mapped signal, and the filtered signal is a baud rate signal. Therefore, after the pre-filtering, when compared with the corresponding mapped signal, the filtered signal has no information loss but occupies narrower bandwidth. A formula for implementing the pre-filtering is $D(k)=W_0 C(k)+W_1 C(k-1)+ \ldots +W_{N-1} C(k-N+1)$, where k is a time sequence number, D(k) is the filtered signal, C(k) is the mapped signal, $0 \leq i \leq N-1$, N−1 is a maximum delay amount based on a time unit, $W_i$ is an $i^{th}$ filter coefficient, and C(k−i) is a signal obtained by delaying C(k) by i time units. $W_i$ can be obtained according to specific optimization of a transmission system. The pre-filtering module 320 sends the filtered signal to the shaping module 330.

The shaping module 330 is configured to receive the filtered signal and perform waveform forming according to the filtered signal to obtain a shaped signal. For example, a filtered signal is "−1, 1, −1, −1 . . . "; at a time when a value is "−1", a negative rectangular wave is output, or at a time when a value is "1", a positive rectangular wave is output. In another manner, an output rectangular wave may be a Gaussian wave, a sine wave, or the like. In order to obtain a better transmitting effect, compensation for a transmit end may further be performed during shaping. The shaping module 330 sends the shaped signal to the digital-to-analog conversion module 340.

The digital-to-analog conversion module 340 is configured to receive the shaped signal, perform digital-to-analog conversion on the shaped signal to obtain an analog signal, and send the analog signal. For example, a shaped signal is sent to the digital-to-analog conversion module 340 for digital-to-analog conversion to obtain an analog signal. Because the bandwidth of the filtered signal is less than bandwidth of data that is allowed to pass through the digital-to-analog converter, a signal loss does not occur. Then, the analog signal is transported to a modulator for modulation to obtain a modulated signal. The modulated signal is sent to a multiplexer to be coupled with a signal of another channel, and a coupled signal is input to a transport optical fiber.

The transmitter in the foregoing solutions converts a broadband mapped signal into a narrowband filtered signal by using a filter, so that the filtered signal can smoothly pass through a digital-to-analog converter whose bandwidth is also narrow, thereby reducing signal damages caused due to insufficient bandwidth of a device.

Figure 14:
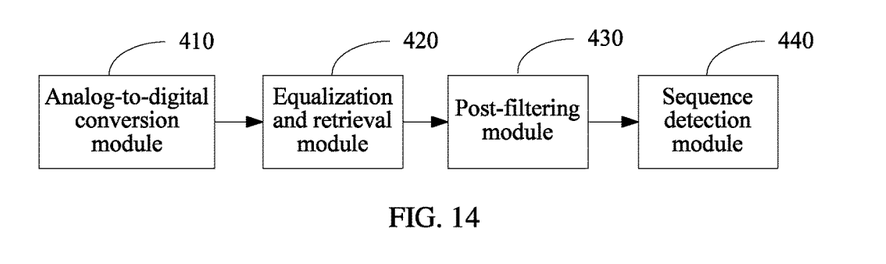
FIG. 14 is a schematic structural diagram of another implementation manner of a receiver according to this application.

Referring to FIG. 14, FIG. 14 is a schematic structural diagram of another implementation manner of a receiver according to this application. The receiver in this implementation manner includes an analog-to-digital conversion module 410, an equalization and retrieval module 420, a post-filtering module 430, and a sequence detection module 440.

The analog-to-digital conversion module 410 is configured to perform analog-to-digital conversion on an analog signal to obtain a digital signal. For example, a demultiplexer decouples a received optical signal to obtain an optical signal, and the optical signal is converted into an analog signal by an opto-electronic detector. Then, analog-to-digital conversion is performed on the analog signal to convert the analog signal into a digital signal. The analog-to-digital conversion module 410 sends the digital signal to the equalization and retrieval module 420.

The equalization and retrieval module 420 is configured to receive the digital signal and perform equalization and retrieval on the digital signal to obtain an equalized and retrieved signal. For example, after a digital signal is obtained, equalization and phase retrieval are performed on the digital signal to obtain an equalized and retrieved signal. Specifically, the digital signal is input to a dispersion compensation module for dispersion compensation to obtain a dispersion compensation signal. The dispersion compensation signal is input to a polarization compensation module for polarization compensation to obtain a polarization compensation signal. The polarization compensation signal is sent to a phase retrieval module to obtain an equalized and retrieved signal. The equalization and retrieval module 420 sends the equalized and retrieved signal to a filtering module 430.

The post-filtering module 430 is configured to receive the equalized and retrieved signal, and perform post-filtering on the equalized and retrieved signal to convert the equalized and retrieved signal to a filtered signal, where the post-filtering is finite impulse response filtering, and bandwidth of the equalized and retrieved signal is greater than bandwidth of the filtered signal. For example, an equalized and retrieved signal is sent to a post-filtering module for post-filtering to obtain a filtered signal. When post-filtering is being performed on the equalized and retrieved signal to convert the equalized and retrieved signal into the filtered signal, a formula for implementing the post-filtering is $F(k)=\hat{W}_0 E(k)+\hat{W}_1 E(k-1)+ \ldots + \widehat{W_{M-j}} E(k-M+1)$, where k is a time sequence number, F(k) is the filtered signal, E(k) is the equalized and retrieved signal, $0 \leq j \leq M-1$, M−1 is a maximum delay amount based on a time unit, $\hat{W}_j$ is a $j^{th}$ filter coefficient, and E(k−j) is a signal obtained by delaying E(k) by j time units. $\hat{W}_j$ is determined by a pre-filter and a system, where a manner of the determining may be a training sequence manner or a noise spectrum analysis manner. After the post-filtering, noise is suppressed. The post-filtering module 430 sends the filtered signal to the sequence detection module 440.

The sequence detection module 440 is configured to receive the filtered signal, and perform sequence detection on the filtered signal to obtain a sequence signal. For example, when sequence detection is being performed on the filtered signal to obtain the sequence signal, an algorithm used for the sequence detection is a Viterbi algorithm or a BCJR algorithm. Because in the sequence detection, a decision is made for all received signals, intersymbol interference can be effectively suppressed.

In the foregoing solutions, a manner of post-filtering is used on a receiver to filter noise, controllable intersymbol interference (ISI) corresponding to a transmitter is introduced, and then sequence detection is performed. White noise, superposed on a channel, of a transmitted signal is amplified by using channel equalization, and is suppressed after post-filtering. In addition, a broadband signal is converted into a narrowband signal in a filtering manner, which introduces controllable intersymbol interference; intersymbol interference can be canceled by using sequence detection in the receiver, thereby improving system performance.

Based on the foregoing method for sending a signal and method for receiving a signal, this application further proposes a signal transmission method. After a signal is sent by using the foregoing method for sending a signal, a signal is received by using the foregoing method for receiving a signal. In addition, in order to achieve optimal performance of a system, it may be set that a maximum delay amount M−1 based on a time unit in a formula for implementing pre-filtering is equal to a maximum delay amount N−1 based on a time unit in a formula for implementing post-filtering.

Based on the foregoing transmitter and receiver, this application further proposes a signal transmission system, where data transmission can be performed between the transmitter and the receiver. In addition, to achieve optimal performance of the system, it may be set that a maximum delay amount M−1 based on a time unit in a formula for implementing pre-filtering is equal to a maximum delay amount N−1 based on a time unit in a formula for implementing post-filtering.

In the several implementation manners provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The integrated unit, when implemented in the form of a software functional unit and sold or used as an independent product, may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the implementation manners of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
performing, by a transmitter, constellation mapping on a data stream to obtain a mapped signal;
performing, by the transmitter, pre-filtering on the mapped signal to convert the mapped signal into a first filtered signal, wherein the pre-filtering is finite impulse response filtering, a bandwidth of the first filtered signal is less than a bandwidth of the mapped signal, and the first filtered signal is a baud rate signal;
performing, by the transmitter, waveform forming according to the first filtered signal to obtain a shaped signal;
performing, by the transmitter, digital-to-analog conversion on the shaped signal to obtain an analog signal;
sending, by the transmitter, the analog signal;
performing, by a receiver, analog-to-digital conversion on the analog signal to obtain a digital signal;
performing, by the receiver, equalization and phase retrieval on the digital signal to obtain an equalized and retrieved signal;
performing, by the receiver, post-filtering on the equalized and retrieved signal to convert the equalized and retrieved signal into a second filtered signal, wherein the post-filtering is finite impulse response filtering, and a bandwidth of the equalized and retrieved signal is greater than a bandwidth of the second filtered signal, wherein the post-filtering filters noise and introduces intersymbol interference (ISI) corresponding to ISI introduced by the transmitter; and
performing, by the receiver, sequence detection on the second filtered signal to obtain a sequence signal, wherein a relation for implementing the pre-filtering is $D(k)=W_0C(k)+W_1C(k-1)+ \ldots +W_{N-1}C(k-N+1)$, wherein k is a time sequence number, $D(k)$ is the first filtered signal, $C(k)$ is the mapped signal, $0 \le i \le N-1$, $N-1$ is a maximum delay amount based on a time unit, $W_i$ is an ith filter coefficient, and $C(k-i)$ is a signal obtained by delaying $C(k)$ by i time units.

2. A method, comprising:
performing, by a transmitter, constellation mapping on a data stream to obtain a mapped signal;
performing, by the transmitter, pre-filtering on the mapped signal to convert the mapped signal into a first filtered signal, wherein the pre-filtering is finite impulse response filtering, a bandwidth of the first filtered signal is less than a bandwidth of the mapped signal, and the first filtered signal is a baud rate signal;

performing, by the transmitter, waveform forming according to the first filtered signal to obtain a shaped signal;

performing, by the transmitter, digital-to-analog conversion on the shaped signal to obtain an analog signal;

sending, by the transmitter, the analog signal;

performing, by a receiver, analog-to-digital conversion on the analog signal to obtain a digital signal;

performing, by the receiver, equalization and phase retrieval on the digital signal to obtain an equalized and retrieved signal;

performing, by the receiver, post-filtering on the equalized and retrieved signal to convert the equalized and retrieved signal into a second filtered signal, wherein the post-filtering is finite impulse response filtering, and a bandwidth of the equalized and retrieved signal is greater than a bandwidth of the second filtered signal, wherein the post-filtering filters noise and introduces intersymbol interference (ISI) corresponding to ISI introduced by the transmitter; and performing, by the receiver, sequence detection on the second filtered signal to obtain a sequence signal, wherein a relation for implementing the post-filtering is $F(k)=\hat{W}_0 E(k)+\hat{W}_1 E(k-1)+ \ldots +\hat{W}_{M-1} E(k-M+1)$, wherein k is a time sequence number, F(k) is the second filtered signal, E(k) is the equalized and retrieved signal, $0 \leq j \leq M-1$, M−1 is a maximum delay amount based on a time unit, $\hat{W}_1$ is a jth filter coefficient, and E(k−j) is a signal obtained by delaying E(k) by j time units, and wherein the maximum delay amount M−1 based on a time unit in the relation for implementing the pre-filtering is equal to the maximum delay amount N−1 based on a time unit in the relation for implementing the post-filtering.

3. A system, comprising:

a transmitter, comprising a first processor and a digital-to-analog converter; and a receiver, comprising an analog-to-digital converter and a second processor;

wherein the first processor is configured to:
perform constellation mapping on a data stream to obtain a mapped signal;
perform pre-filtering on the mapped signal to convert the mapped signal into a first filtered signal, wherein the pre-filtering is finite impulse response filtering, a bandwidth of the first filtered signal is less than a bandwidth of the mapped signal, and the first filtered signal is a baud rate signal; and
perform waveform forming according to the first filtered signal to obtain a shaped signal;

wherein the digital-to-analog converter is configured to perform digital-to-analog conversion on the shaped signal to obtain an analog signal, and to send the analog signal to the receiver;

wherein the analog-to-digital converter is configured to perform analog-to-digital conversion on the analog signal to obtain a digital signal; and wherein the second processor is configured to:
perform equalization and phase retrieval on the digital signal to obtain an equalized and retrieved signal;
perform post-filtering on the equalized and retrieved signal to convert the equalized and retrieved signal into a second filtered signal, wherein the post-filtering is finite impulse response filtering, and a bandwidth of the equalized and retrieved signal is greater than a bandwidth of the second filtered signal, and wherein the post-filtering filters noise and introduces intersymbol interference (ISI) corresponding to ISI introduced by the transmitter; and
perform sequence detection on the second filtered signal to obtain a sequence signal, wherein a relation for implementing the pre-filtering by the second processor is $D(k)=W_0 C(k)+W_1 C(k-1)+ \ldots +W_{N-1} C(k-N+1)$, wherein k is a time sequence number, D(k) is the filtered signal, C(k) is the mapped signal, $0 \leq i \leq N-1$, N−1 is a maximum delay amount based on a time unit, $W_i$ is an ith filter coefficient, and C(k−i) is a signal obtained by delaying C(k) by i time units.

* * * * *

UNITED STATES PATENT AND TRADEMARK OFFICE
CERTIFICATE OF CORRECTION

PATENT NO. : 10,193,713 B2
APPLICATION NO. : 15/270286
DATED : January 29, 2019
INVENTOR(S) : Li et al.

It is certified that error appears in the above-identified patent and that said Letters Patent is hereby corrected as shown below:

In the Claims

In Column 19, Line 30, Claim 2, delete "$\hat{W}_1$" and insert --$\hat{W}_j$--.

Signed and Sealed this
Twenty-sixth Day of March, 2019

Andrei Iancu
*Director of the United States Patent and Trademark Office*